US012719104B2

(12) United States Patent
Park et al.

(10) Patent No.: US 12,719,104 B2
(45) Date of Patent: Aug. 25, 2026

(54) BATTERY MODULE AND BATTERY PACK INCLUDING THE SAME

(71) Applicant: LG Energy Solution, Ltd., Seoul (KR)

(72) Inventors: Won Kyoung Park, Daejeon (KR); Junyeob Seong, Daejeon (KR); Subin Park, Daejeon (KR); Honggoo Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 651 days.

(21) Appl. No.: 18/021,154

(22) PCT Filed: Jan. 6, 2022

(86) PCT No.: PCT/KR2022/000251

§ 371 (c)(1),
(2) Date: Feb. 13, 2023

(87) PCT Pub. No.: WO2022/149887

PCT Pub. Date: Jul. 14, 2022

(65) Prior Publication Data

US 2023/0318078 A1 Oct. 5, 2023

(30) Foreign Application Priority Data

Jan. 11, 2021 (KR) ........................ 10-2021-0003175

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/647* (2015.04);
(Continued)

(58) Field of Classification Search
None
See application file for complete search history.

(56) References Cited

U.S. PATENT DOCUMENTS

2012/0009455 A1 1/2012 Yoon
2012/0177965 A1 7/2012 Lee et al.
(Continued)

FOREIGN PATENT DOCUMENTS

CN 107735882 A 2/2018
CN 110168799 A 8/2019
(Continued)

OTHER PUBLICATIONS

KR-20150037335-A English machine translation (Year: 2015).*

*Primary Examiner* — Scott J. Chmielecki
(74) *Attorney, Agent, or Firm* — BRYAN CAVE LEIGHTON PAISNER LLP

(57) ABSTRACT

A battery module and a battery pack including the same are provided. The battery module includes a battery cell stack in which a plurality of battery cells are stacked, the battery cell including a protruding electrode lead, and a cooling fin located between the battery cells, the cooling fin being disposed so as to come into contact with a region including one end portion of the battery cell in a direction in which the electrode lead protrudes.

11 Claims, 8 Drawing Sheets

(51) Int. Cl.

| | |
|---|---|
| ***H01M 10/647*** | (2014.01) |
| ***H01M 10/653*** | (2014.01) |
| ***H01M 50/211*** | (2021.01) |
| ***H01M 50/242*** | (2021.01) |

(52) U.S. Cl.
CPC ....... *H01M 10/653* (2015.04); *H01M 50/211* (2021.01); *H01M 50/242* (2021.01)

(56) References Cited

U.S. PATENT DOCUMENTS

| | | | | |
|---|---|---|---|---|
| 2014/0045028 | A1 | 2/2014 | Moon et al. | |
| 2015/0037335 | A1* | 2/2015 | Westbrook | A61P 13/10 514/8.4 |
| 2017/0104252 | A1 | 4/2017 | Wunsche et al. | |
| 2018/0183117 | A1 | 6/2018 | Cho et al. | |
| 2018/0375077 | A1 | 12/2018 | Shin et al. | |
| 2019/0260099 | A1* | 8/2019 | Ju | H01M 10/486 |
| 2020/0106058 | A1 | 4/2020 | Kim | |
| 2020/0274213 | A1 | 8/2020 | Cho et al. | |
| 2020/0411815 | A1* | 12/2020 | Shin | H01M 10/653 |
| 2021/0028423 | A1 | 1/2021 | Shin et al. | |
| 2022/0173453 | A1* | 6/2022 | Jo | H01M 10/6551 |
| 2022/0302529 | A1 | 9/2022 | Kim | |
| 2024/0339697 | A1 | 10/2024 | Shim | |

FOREIGN PATENT DOCUMENTS

| | | | | | |
|---|---|---|---|---|---|
| CN | 210350040 | U | | 4/2020 | |
| JP | 2012018915 | A | | 1/2012 | |
| JP | 2012160543 | A | | 8/2012 | |
| JP | 2013004255 | A | | 1/2013 | |
| JP | 2013513202 | A | | 4/2013 | |
| JP | 2015109200 | A | | 6/2015 | |
| JP | 2019-186034 | A | | 10/2019 | |
| JP | 2020-522111 | A | | 7/2020 | |
| JP | 2020113463 | A | | 7/2020 | |
| KR | 10-2006-0082302 | A | | 7/2006 | |
| KR | 10-1084066 | B1 | | 11/2011 | |
| KR | 10-2012-0050799 | A | | 5/2012 | |
| KR | 10-2012-0062320 | A | | 6/2012 | |
| KR | 10-2014-0004830 | A | | 1/2014 | |
| KR | 10-2015-0037335 | A | | 4/2015 | |
| KR | 20150037335 | A | * | 4/2015 | H01M 10/627 |
| KR | 10-2016-0146587 | A | | 12/2016 | |
| KR | 10-2017-0041630 | A | | 4/2017 | |
| KR | 10-2018-0020547 | A | | 2/2018 | |
| KR | 10-2018-0135701 | A | | 12/2018 | |
| KR | 10-2019-0063809 | A | | 6/2019 | |
| KR | 10-2020-0129991 | A | | 11/2020 | |
| WO | WO-2020231071 | A1 | * | 11/2020 | H01M 10/623 |

* cited by examiner

BATTERY MODULE AND BATTERY PACK INCLUDING THE SAME

CROSS CITATION WITH RELATED APPLICATION(S)

This application is a National Stage Application of International Application No. PCT/KR2022/000251, filed on Jan. 6, 2022, which claims the benefit of Korean Patent Application No. 10-2021-0003175 filed on Jan. 11, 2021, the disclosures of which are incorporated herein by reference in their entirety.

FIELD

The present disclosure relates to a battery module and a battery pack including the same, and more particularly, to a battery module having improved cooling performance and a battery pack including the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, the demand for development of the secondary battery is growing.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a cathode active material and an anode active material, respectively. The lithium secondary battery includes an electrode assembly in which a cathode plate and an anode plate, each being coated with the cathode active material and the anode active material, are arranged with a separator being interposed between them, and a battery case which seals and houses the electrode assembly together with an electrolyte solution.

Generally, the lithium secondary battery may be classified based on the shape of the exterior material into a can type secondary battery in which the electrode assembly is mounted in a metal can, and a pouch-type secondary battery in which the electrode assembly is mounted in a pouch of an aluminum laminate sheet.

In the case of a secondary battery used for small-sized devices, two to three battery cells are arranged, but in the case of a secondary battery used for a middle or large-sized device such as an automobile, a battery module in which a large number of battery cells are electrically connected is used. In such a battery module, a large number of battery cells are connected to each other in series or parallel to form a cell assembly, thereby improving capacity and output. In addition, one or more battery modules can be mounted together with various control and protection systems such as a BMS (battery management system) and a cooling system to form a battery pack.

When the temperature of the secondary battery rises higher than an appropriate temperature, the performance of the secondary battery may be deteriorated, and in the worst case, there is also a risk of an explosion or ignition. In particular, a large number of secondary batteries, that is, a battery module or a battery pack having battery cells, can add up the heat generated from the large number of battery cells in a narrow space, so that the temperature can rise more quickly and excessively. In other words, a battery module in which a large number of battery cells are stacked, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, in the case of a battery module included in a vehicle battery pack, it is frequently exposed to direct sunlight and may be placed under high-temperature conditions such as summer or desert areas.

Meanwhile, since the battery module is configured by compactly stacking a plurality of battery cells, the battery cell located on the outermost side is more greatly affected by the external environment. Due to this, the temperature deviation between battery cells may be deepened. Such temperature non-uniformity of the battery cells may cause a reduction in the lifespan of the battery module itself.

Therefore, when configuring a battery module or a battery pack, it may be very important to secure effective cooling performance and reduce the temperature deviation of the battery cells.

SUMMARY

Technical Problem

It is an object of the present disclosure to provide a battery module having improved cooling performance and minimized temperature deviation of the battery cells and a battery pack including the same.

However, the problem to be solved by the embodiments of the present disclosure is not limited to the above-described problems, and can be variously expanded within the scope of the technical idea included in the present disclosure.

Technical Solution

According to one aspect of the present disclosure, there is provided a battery module comprising: a battery cell stack in which a plurality of battery cells are stacked; and a cooling fin located between the battery cells, wherein the battery cell includes a protruding electrode lead, and wherein the cooling fin is disposed so as to come into contact with a region including one end portion of the battery cell in a direction in which the electrode lead protrudes.

The electrode lead may include a first electrode lead and a second electrode lead that protrude in directions opposite to each other, and that have different polarities from each other.

The cooling fin may include a first cooling fin and a second cooling fin. The first cooling fin may come into contact with a region including one end portion of the battery cell in a direction in which the first electrode lead protrudes, and the second cooling fin may come into contact with a region including the other end portion of the battery cell in a direction in which the second electrode lead protrudes.

The first cooling fin and the second cooling fin may be disposed so as to be spaced apart from each other, along a direction in which the first electrode lead and the second electrode lead protrude, between the battery cells.

The battery module may further include an adhesive member located between the battery cells, and the adhesive member may be located between the first cooling fin and the second cooling fin.

An upper surface and a lower surface of the battery cell stack may be exposed.

The battery module may further include an elastic member that covers a front surface, a rear surface and both side surfaces of the battery cell stack.

The elastic member may be continuously connected along the front surface, the rear surface and the both side surfaces of the battery cell stack.

The battery module may further include a first sensing block located between the front surface of the battery cell stack and the elastic member, and a second sensing block located between the rear surface of the battery cell stack and the elastic member.

The battery module may further include a side surface pad located between the both side surfaces of the battery cell stack and the elastic member.

According to another aspect of the present disclosure, there is provided a battery pack comprising: the battery module; a pack frame that houses the battery module; and a thermal conductive resin layer located between the battery module and a bottom part of the pack frame. The cooling fin may extend from a lower surface of the battery cell stack and come into contact with the thermal conductive resin layer.

The battery cell may come into contact with the thermal conductive resin layer.

Advantageous Effects

According to embodiments of the present disclosure, the cooling fin is partially arranged in the portion where heat generation of the battery cells is excessive, so that the temperature deviation between each of the portions of the battery cells can be minimized.

In addition, the structure that exposes the lower surface of the battery cell stack can simplify the heat transfer path and thus improve the cooling performance.

The effects of the present disclosure are not limited to the effects mentioned above and additional other effects not described above will be clearly understood from the description of the appended claims by those skilled in the art.

DETAILED DESCRIPTION

Figure 1:
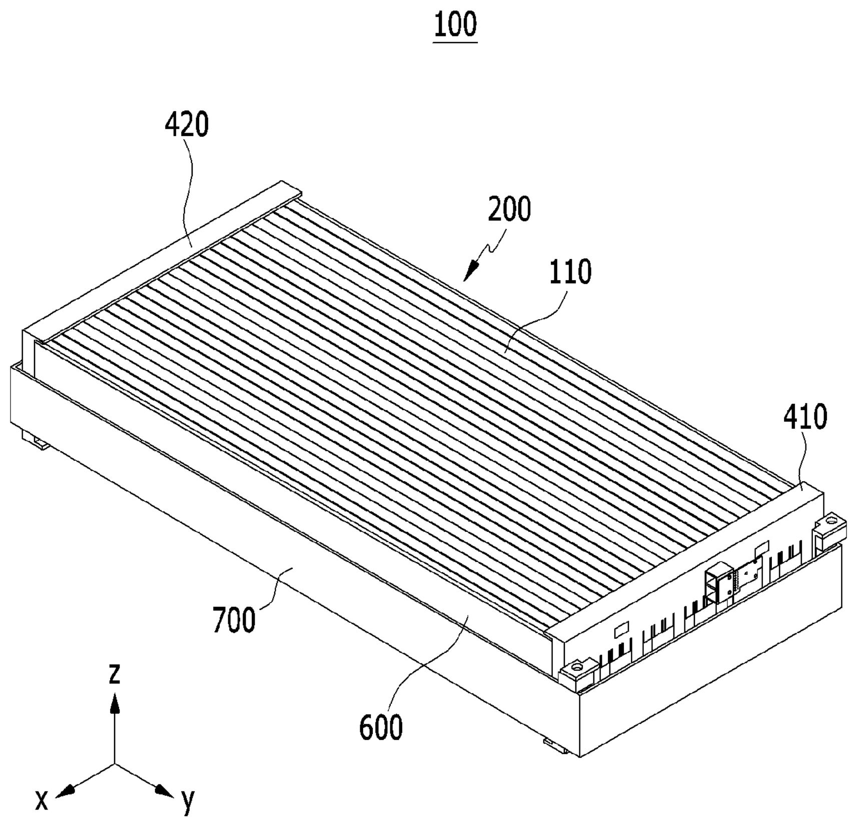
FIG. 1 is a perspective view which shows a battery module according to an embodiment of the present disclosure.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means arranged on or below a reference portion, and does not necessarily mean being arranged on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 2:
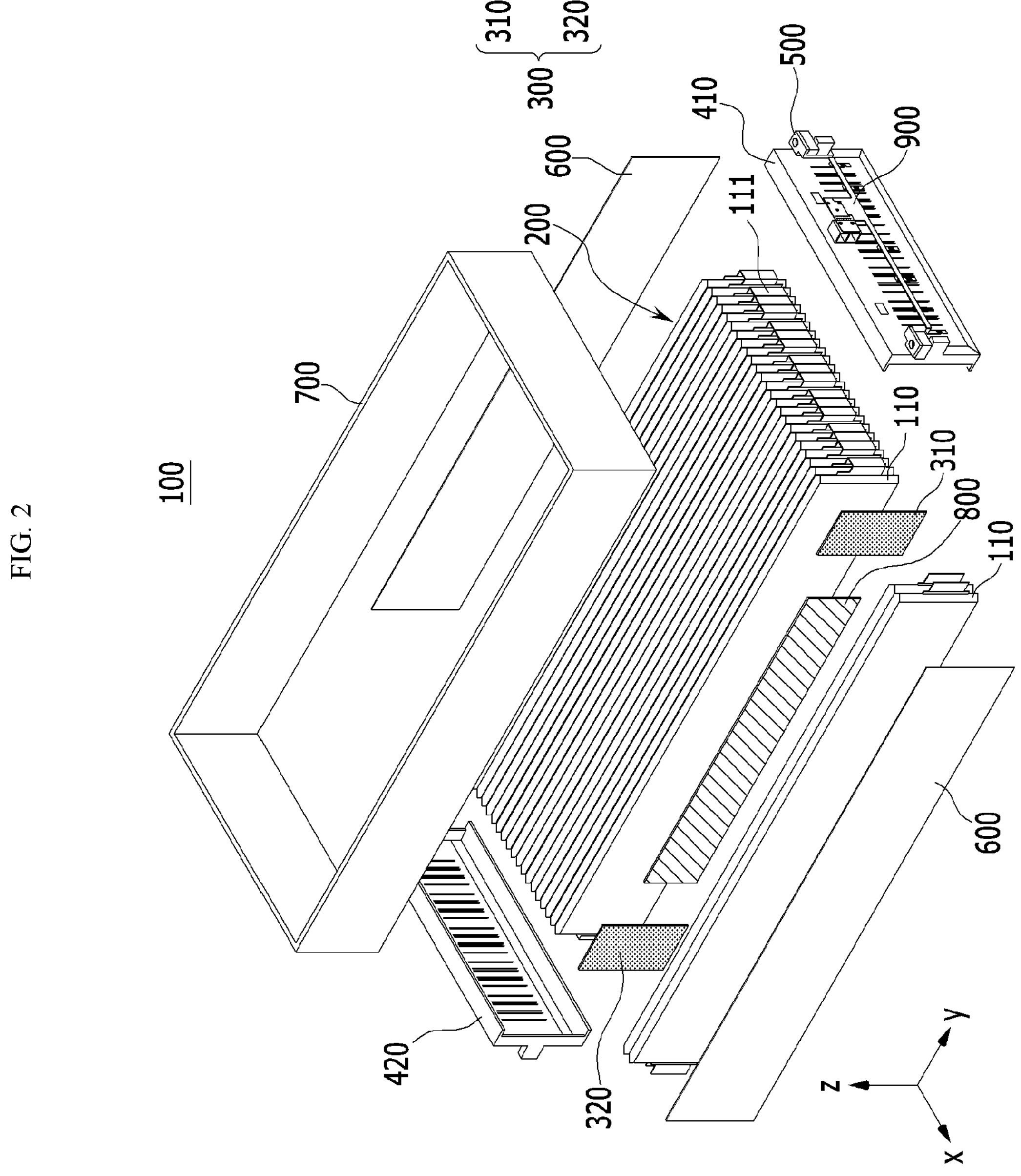
FIG. 2 is an exploded perspective view of the battery module of FIG. 1.
Figure 3:
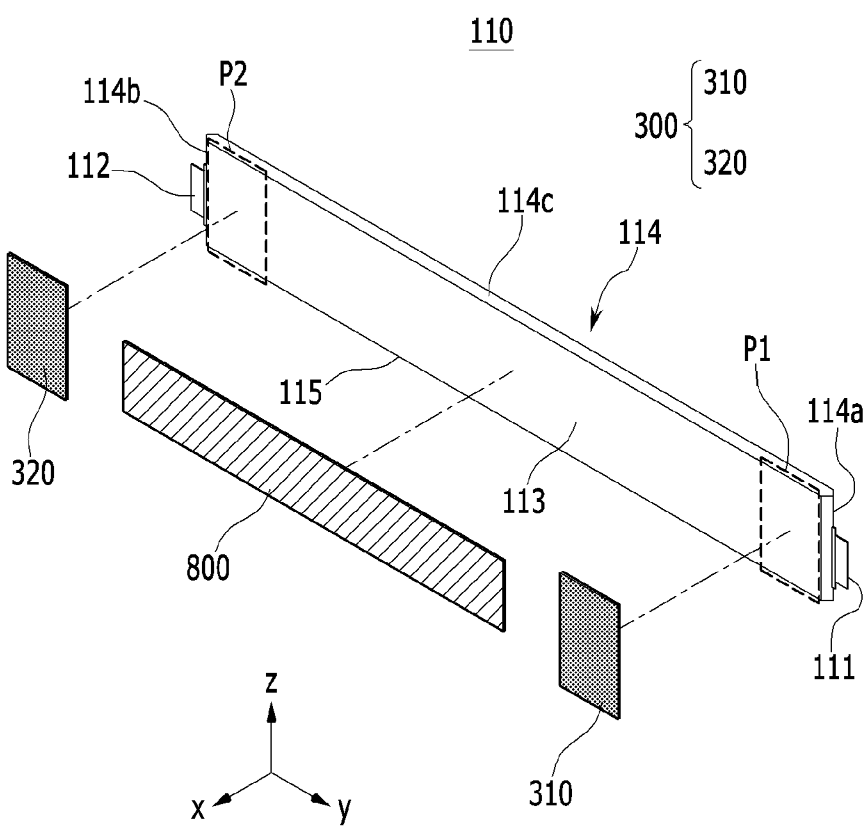
FIG. 3 is a perspective view which shows a battery cell and a cooling fin included in the battery module of FIG. 2.

FIG. 1 is a perspective view which shows a battery module according to an embodiment of the present disclosure. FIG. 2 is an exploded perspective view of the battery module of FIG. 1. FIG. 3 is a perspective view which shows a battery cell and a cooling fin included in the battery module of FIG. 2.

Referring to FIGS. 1 to 3, the battery module 100 according to an embodiment of the present disclosure includes a battery cell stack 200 in which a plurality of battery cells 110 are stacked, and a cooling fin 300 located between the battery cells 110. Specifically, the cooling fin 300 is located between the battery cells 110 adjacent to each other among the battery cells 110.

First, the battery cells 110 are preferably a pouch-type battery cell, and can be formed in a rectangular sheet-like structure. The battery cell 110 according to the present embodiment includes first and second electrode leads 111 and 112 that are protruded. Specifically, the battery cell 110 according to the present embodiment has a structure in which the first and second electrode leads 111 and 112 face each other with respect to the cell body 113 and protrude from one end portion 114*a* and the other end portion 114*b*, respectively. More specifically, the first and second electrode leads 111 and 112 are connected to an electrode assembly (not shown), and protruded from the electrode assembly (not shown) to the outside of the battery cell 110. The first and second electrode leads 111 and 112 have different polarities from each other and thus, for example, one of them may be a cathode lead 111 and the other may be an anode lead 112. That is, the cathode lead 111 and the anode lead 112 can be protruded in the directions in which they face each other with respect to one battery cell 110.

Meanwhile, the battery cell 110 can be manufactured by joining both end portions 114*a* and 114*b* of the cell case 114 and one side portion 114*c* connecting them in a state in which an electrode assembly (not shown) is housed in a cell case 114. In other words, the battery cells 110 according to the present embodiment have a total of three sealing portions, the sealing portion has a structure in which it is sealed by a method such as heat fusion, and the other side portion can be composed of a connection portion 115. The cell case 114 can be composed of a laminated sheet including a resin layer and a metal layer.

Such a battery cell 110 may be composed of a plurality of cells, and the plurality of battery cells 110 may be stacked together so as to be electrically connected with each other, thereby forming the battery cell stack 200. In particular, as shown in FIGS. 1 and 2, a plurality of battery cells 110 may be stacked along a direction parallel to the x-axis. Thereby, the electrode leads 111 and 112 may protrude in the y-axis direction and the −y-axis direction, respectively.

The cooling fin 300 according to the present embodiment is disposed so as to come into contact with a region P1 including the one end portion 114*a* of the battery cell 110 in the direction in which the electrode lead 111 protrudes. More specifically, the cooling fin 300 according to the present embodiment may include a first cooling fin 310 and a second cooling fin 320, wherein the first cooling fin 310 may come into contact with a region P1 including one end portion 114*a* of the battery cell 110 in a direction in which the first electrode lead 111 protrudes, and the second cooling fin 320 may come into contact with a region P2 including the other end portion of the battery cell 110 in a direction in which the second electrode lead 112 protrudes. That is, the first cooling fin 310 and the second cooling fin 320 may be disposed so as to be spaced apart from each other, along a direction in which the first and second electrode leads 111 and 112 protrude (direction parallel to the y-axis), between the battery cells 110.

When the battery cell 110 are repeatedly charged and discharged, a great amount of heat is generated in the electrode leads 111 and 112. Thereby, the region P1 including one end portion 114*a* of the battery cell 110 in the direction in which the first electrode lead 111 protrudes and the region P2 including the other end portion 114*b* of the battery cell 110 in the direction in which the second electrode lead 112 protrudes show a higher temperature than the central portion. Thus, according to the present embodiment, the first cooling fin 310 and the second cooling fin 320 are respectively disposed in the portion where heat generation is excessive among the battery cell 110, thereby capable of improving heat dissipation and cooling performance.

In FIG. 2, only a pair of cooling fins 300 are illustrated, but all the cooling fins 300 according to the present embodiment may be located between the battery cells 110.

Figure 4:
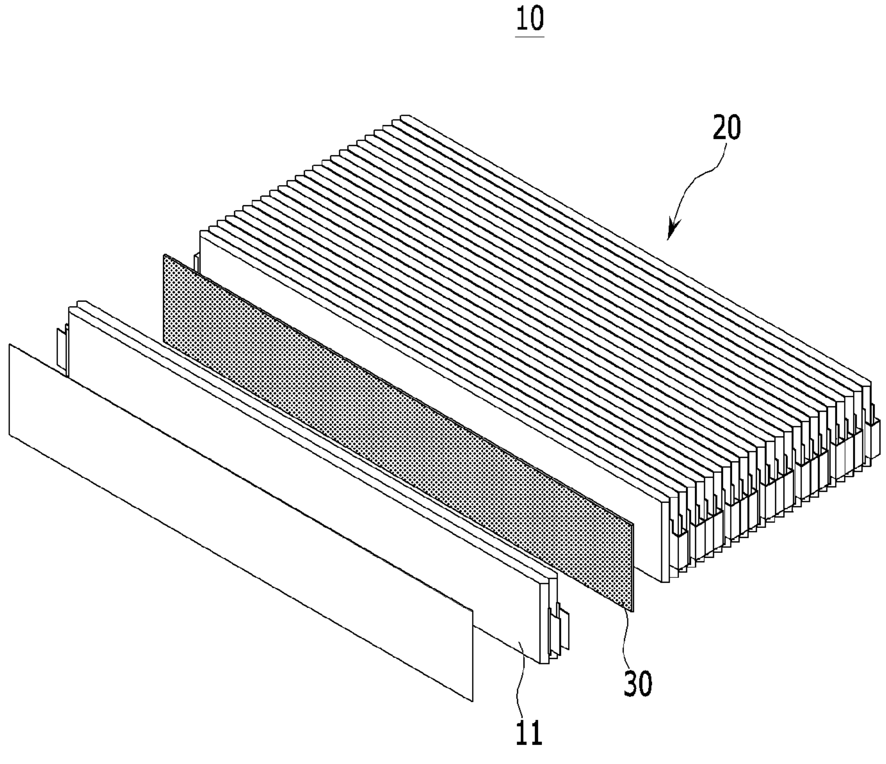
FIG. 4 is a perspective view which shows a battery module according to a comparative example of the present disclosure.

FIG. 4 is a perspective view which shows a battery module according to a comparative example of the present disclosure.

Referring to FIG. 4, the battery module 10 according to the comparative example of the present disclosure includes a battery cell stack 20 on which the battery cells 11 are stacked and a cooling fin 30 located between the battery cells 11. The cooling fin 30 according to this comparative example may be disposed so as to cover the whole of one surface of the main body of the battery cell 11. With respect to the battery cell 110 having a large difference in heat generation for each portion, the cooling fin 30 formed so as to cover the whole of one surface of the main body of the battery cell 11 makes it difficult to eliminate the temperature difference between the portions of the battery cell 110.

Unlike the same, since the cooling fin 300 according to the present embodiment includes a first cooling fin 310 and a second cooling fin 320, heat dissipation can be effectively performed at both end portions 114*a* and, 114*b* where heat generation of the battery cell 110 is excessive, and the temperature deviation between each of the portions with respect to one battery cell 110 can be minimized. Since the temperature deviation between each of the portions of the battery cell 110 ultimately causes a decrease in the performance of the battery module 100, the first cooling fin 310 and the second cooling fin 320 according to the present embodiment may contribute to improving the performance and lifespan of the battery module.

Meanwhile, the cooling fin 300 according to the present embodiment may include a metal material having high thermal conductivity. The specific material thereof is not limited, but for example, it may include aluminum (Al).

Meanwhile, the battery module 100 according to the present embodiment may further include an adhesive member 800 located between the battery cells 110. The adhesive member 800 may be located between the first cooling fin 310 and the second cooling fin 320 that are spaced apart from each other. The adhesive member 800 can be applied without particular limitation as long as it is a thin member having adhesive properties. As an example, a double-sided tape or an adhesive sprayed in the form of a spray can be used as the adhesive member 800.

In order to obtain a high output, a plurality of battery cells 110 can be stacked to form a battery cell stack 200. However, as the number of battery cells 110 increases, fixing between the battery cells 110 may become an issue. In the battery module 100 according to the present embodiment, since the first cooling fin 310 and the second cooling fin 320 that are spaced apart from each other are disposed, a space to which the adhesive member 800 is attached can be provided between them. In the case of the battery module 10 according to the comparative example of the present disclosure shown in FIG. 4, since the cooling fin 30 covers the whole of one surface of the main body of the battery cell 11, there is no separate space for the adhesive member to be attached. The battery module 100 according to the present embodiment has the advantage that the adhesive member 800 can be attached between the battery cells 110, thereby increasing the fixing force between the battery cells 110.

Referring to FIG. 2 again, the battery module 100 according to the present embodiment may further include an elastic member 700 that covers a front surface, a rear surface and both side surfaces of the battery cell stack 200. Here, the front surface means a surface of the battery cell stack 200 in the y-axis direction, the rear surface means a surface of the battery cell stack 200 in the −y-axis direction, and both side surfaces mean surfaces of the battery cell stack 200 in the x-axis and −x-axis directions, respectively. However, these are surfaces mentioned for convenience of explanation, and may vary depending on the position of a target object or the position of an observer. Meanwhile, the front surface and the rear surface of the battery cell stack 200 may be surfaces on which the protruded electrode leads 111 and 112 of the battery cells 110 are located.

The elastic member 700 according to the present embodiment may be continuously connected along the front surface, the rear surface, and the both side surfaces of the battery cell stack 200. In the process of repeatedly charging and discharging a plurality of battery cells 110, a phenomenon in which the internal electrolyte decomposes to generate gas and the battery cell 110 swells, that is, a swelling phenomenon, may occur. In particular, each battery cell 110 may cause swelling in the stacking direction of the battery cells 110 (direction parallel to the x-axis). In the present embodiment, since the elastic member 700 having elasticity is continuously connected along the front surface, the rear surface and the both side surfaces of the battery cell stack 200, swelling of the battery cells 110 can be suppressed and controlled, and deformation of the battery module 100 in the stacking direction of the battery cells 110 can be prevented.

Further, the battery module according to the present embodiment can form a module-less structure in which the module frame and the end plate are removed. The shape of the battery module 100 according to the present embodiment can be maintained and fixed by the elastic member 700 instead of the module frame or the end plate. As the module frame and end plate are removed, complicated processes that require precise control, such as a process of housing the battery cell stack 200 in the module frame or a process of assembling the module frame and the end plate, are unnecessary. Additionally, it has the advantage that the weight of the battery module 100 can be greatly reduced by the removed module frame and end plate. Further, the battery module 100 according to the present embodiment has the advantage that as the module frame is removed, it is easy to rework during the battery pack assembly process, but this can be distinguished from a conventional battery module having a module frame in which it is not possible to rework even if a defect occurs in the welded structure of the module frame.

Further, the upper surface and lower surface of the battery cell stack 200 are exposed to the outside. However, because it is more effective for heat dissipation than being surrounded by the module frame, the cooling performance can be improved. Here, the upper surface means a surface of the battery cell stack 200 in the z-axis direction, and the lower surface means a surface of the battery cell stack 200 in the −z-axis direction. In particular, the lower surface of the battery cell stack 200 is exposed, wherein the lower surface of the battery cell stack 200 may come into direct contact with a thermal conductive resin layer described later.

If the elastic member 700 has a predetermined elastic force, the material thereof is not particularly limited, but for example, it may include at least one of a polymer composite material, a composite material such as fiber-reinforced plastic (FRB), and a metal alloy.

Meanwhile, the battery module 100 according to the present embodiment may further include a plate-shaped side surface pad 600 located between the both side surfaces of the battery cell stack 200 and the elastic member 700. Instead of removing the module frame and the end plate, side surface pads 600 are disposed on both sides of the battery cell stack 200, so that the rigidity of the battery module 100 can be supplemented, and a buffer function between the battery cell 110 and the elastic member 700 can be performed. A foam material pad can be applied to the side surface pad 600.

Next, the first and second sensing blocks and the LV sensing assembly will be described in detail with reference to FIGS. 5 and 6.

Figure 5:
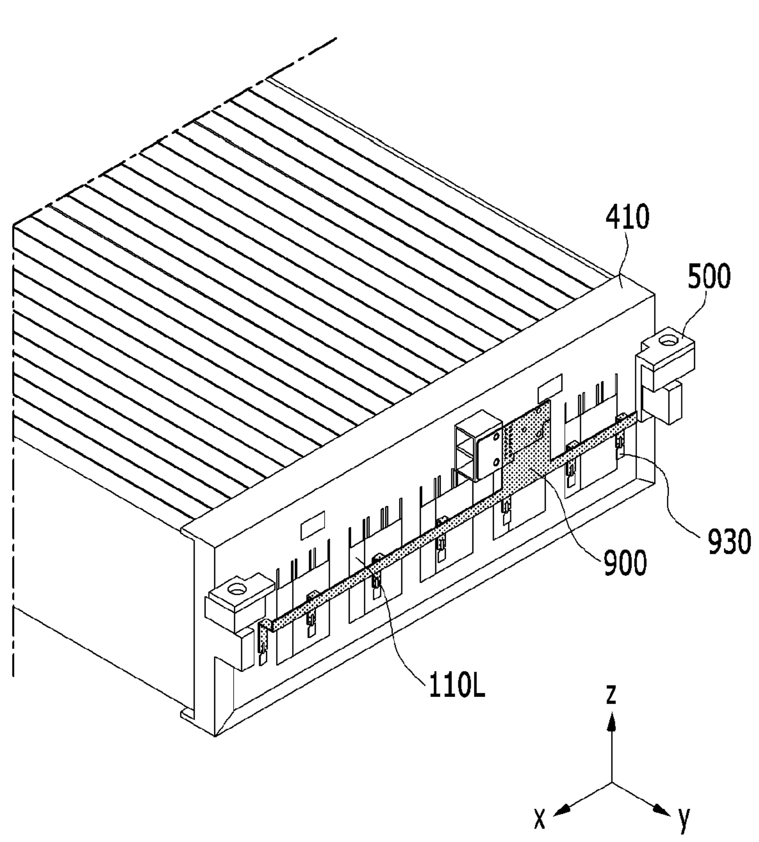
FIG. 5 is a partial perspective view which enlarges and shows a front portion of the battery module of FIG. 1.

FIG. 5 is a partial perspective view which enlarges and shows a front portion of the battery module of FIG. 1. FIG. 6 is a view of the front portion of the battery module of FIG. 5 as viewed from the front. However, FIGS. 5 and 6 show a state in which the elastic member is omitted for convenience of explanation.

Referring to FIGS. 2, 3, 5 and 6 together, the battery module 100 according to an embodiment of the present disclosure may include a first sensing block 410 and a second sensing block 420. The first sensing block 410 may be located between the front surface of the battery cell stack 200 and the elastic member 700, and the second sensing block 420 may be located between the rear surface of the battery cell stack 200 and the elastic member 700.

The first sensing block 410 and the second sensing block 420 may include a material having electrical insulation, and as an example, it may include a plastic material, a polymer material, or a composite material. Further, the first sensing block 410 and the second sensing block 420 may have a kind of basket shape, and can be configured so as to cover the front surface and the rear surface of the battery cell stack 200, respectively.

Figure 6:
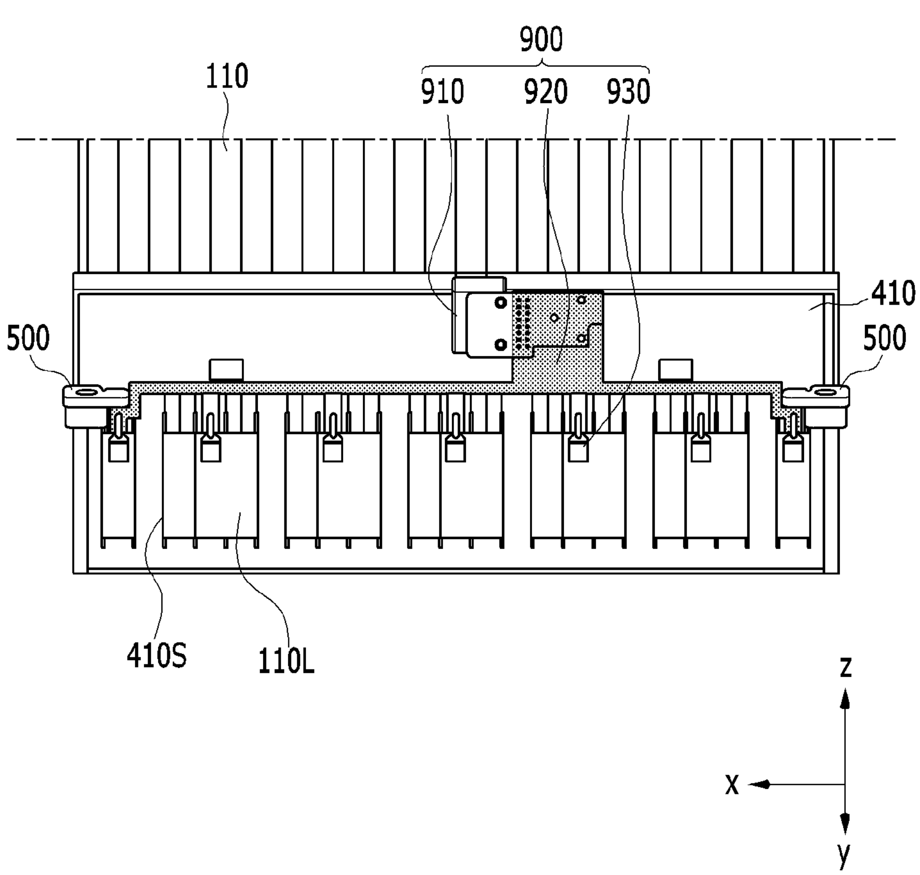
FIG. 6 is a view of the front portion of the battery module of FIG. 5 as viewed from the front.

Next, although the first sensing block 410 shown in FIGS. 5 and 6 will be mainly described, the same or similar structure can be applied to the second sensing block 420.

As described above, the electrode leads 111 and 112 may be located on the front surface of the battery cell stack 200. A slit 410S may be formed in the first sensing block 410, and when the first sensing block 410 is disposed, the electrode leads 111 and 112 can pass through a slit 410S. Next, at least two electrode leads 111 and 112 may be bent and joined to form an electrode lead joined body 110L. Specifically, the electrode leads 111 and 112 protruding in the same direction with respect to the adjacent battery cells 110 are bent in a direction perpendicular to the protruding direction of the electrode leads 111 and 112, and are joined to each other to form an electrode lead joined body 110L. Thereby, one surface of the electrode lead joined body 110L may be perpendicular to a direction (y-axis direction) in which the electrode leads 111 and 112 protrude from the battery cell 110. In this case, electrode leads having the same polarities can be joined to each other, or electrode leads having different polarities may be joined to each other. In other words, in order to realize a parallel connection between the battery cells 110, electrode leads having the same polarities can be joined to each other. Additionally, in order to realize a series connection between the battery cells 110, electrode leads having different polarities can be joined to each other. This can vary depending on the design of the battery module.

Meanwhile, the electrode leads 111 and 112 of the battery cells 110 located outside the battery cell stack 200 may be connected to a terminal busbar 500. Unlike the conventional battery module in which the electrode leads are connected to each other through a busbar, the electrode leads 111 and 112 according to the present embodiment are directly joined to each other, and a part thereof can be connected to the terminal busbar 500 to form a HV (high voltage) connection. Here, the HV connection is a connection that serves as a power source for supplying power, and means a connection between battery cells or a connection between battery modules. Unlike the conventional battery module in which the electrode leads are connected to each other through a busbar, the electrode leads 111 and 112 according to the present embodiment are directly joined to each other, and a part thereof is connected to the terminal busbar 500 to form an HV connection. Therefore, in the HV connection structure according to the present embodiment, the busbar and the busbar frame to which the busbar is mounted can be removed.

Meanwhile, the battery module 100 according to the present embodiment may include a low voltage (LV) sensing assembly 900 for transmitting voltage information of a battery cell. The LV sensing assembly 900 may be located in at least one of the first sensing block 410 and the second sensing block 420. Specifically, the LV sensing assembly 900 can be located on the opposite side of a surface facing the battery cell stack 200 among the first sensing block 410. Similarly, although not specifically shown, the LV sensing assembly 900 can be located on the opposite side of a surface facing the battery cell stack 200 among the second sensing block 420.

The LV sensing assembly 900 is for a low voltage (LV) connection, wherein the LV connection means a sensing connection for sensing and controlling a voltage of a battery cell. Voltage information and temperature information of the battery cell 110 can be transmitted to an external BMS (Battery Management System) via the LV sensing assembly 900.

Such LV sensing assembly 900 may include an LV connector 910, a connection member 920 for connecting the LV connector 910 and the electrode leads 111 and 112, and a joining plate 930 located at one end of the connecting member 920 and joined to the electrode leads 111 and 112.

The LV connector 910 can be configured to transmit and receive signals to and from an external control device to control the plurality of battery cells 110. The connection member 920 may be a flexible printed circuit board (FPCB) or a flexible flat cable (FFC). Voltage and temperature information measured from the plurality of battery cells 110 may be transmitted to an external battery management system (BMS) via the connection member 920 and the LV connector 910. That is, the LV sensing assembly 900 including the LV connector 910 and the connection member 920 can detect and control phenomena such as overvoltage, overcurrent, and overheating of each battery cell 110. The joining plate 930 is located at one end of the connection member 920 and may be made of a metal material having electrical conductivity. By joining such a joining plate 930 to the electrode leads 111 and 112, the connecting member 920 and the electrode lead 111 can be electrically and physically connected. Specifically, one side of the joining plate 930 passes through the connection member 920 and is then bent to thereby be coupled with the connection member 920, and the other side of the joining plate 930 can be formed in a plate shape to be joined, particularly weld-joined, to the electrode leads 111 and 112.

On the other hand, as described above, the battery cells 110 may be stacked along the x-axis direction to form the battery cell stack 200, whereby the electrode leads 111 and 112 may protrude in the y-axis direction and the −y-axis direction, respectively. At this time, as described above, at least two electrode leads 111 and 112 may be bent and joined to form the electrode lead joined body 110L. The joining plate 930 of the LV sensing assembly 900 can be directly joined to the electrode lead joined body 110L, so that the LV sensing assembly 900 and the electrode leads 111 and 112 can be connected to each other. Since the battery module 100 according to the present embodiment can proceed at once without HV connection and LV connection, respectively. The productivity improvement can be expected, and components such as busbar frames can be removed. Thus, there is an advantage that the battery module 100 having a more compact configuration can be manufactured.

In the joining between the electrode leads 111 and 112 for forming the electrode lead joined body 110L or the joining between the electrode lead joined body 110L and the joining plate 930, the joining method thereof is not particularly limited as long as electrical connection is possible, and as an example, the weld-joining can be performed. Further, the electrode leads 111 and 112 protruding in the y-axis direction are mainly described, but with respect to for the electrode leads 111 and 112 protruding in the −y axis direction, the structure of the electrode lead joined body and the LV sensing assembly 900 can be formed similarly.

Meanwhile, as shown in FIGS. 1 and 2, the elastic member 700 according to the present embodiment may cover the electrode leads 111 and 112, that is, the electrode lead joined body 110L. Structurally, the electrode lead joined body 110L is located outside the first sensing block 410 or the second sensing block 420. Since the elastic member 700 covers the electrode lead joined body 110L, it is possible to protect it from the external environment.

Next, a battery pack according to an embodiment of the present disclosure will be described in detail with reference to FIGS. 7 and 8.

Figure 7:
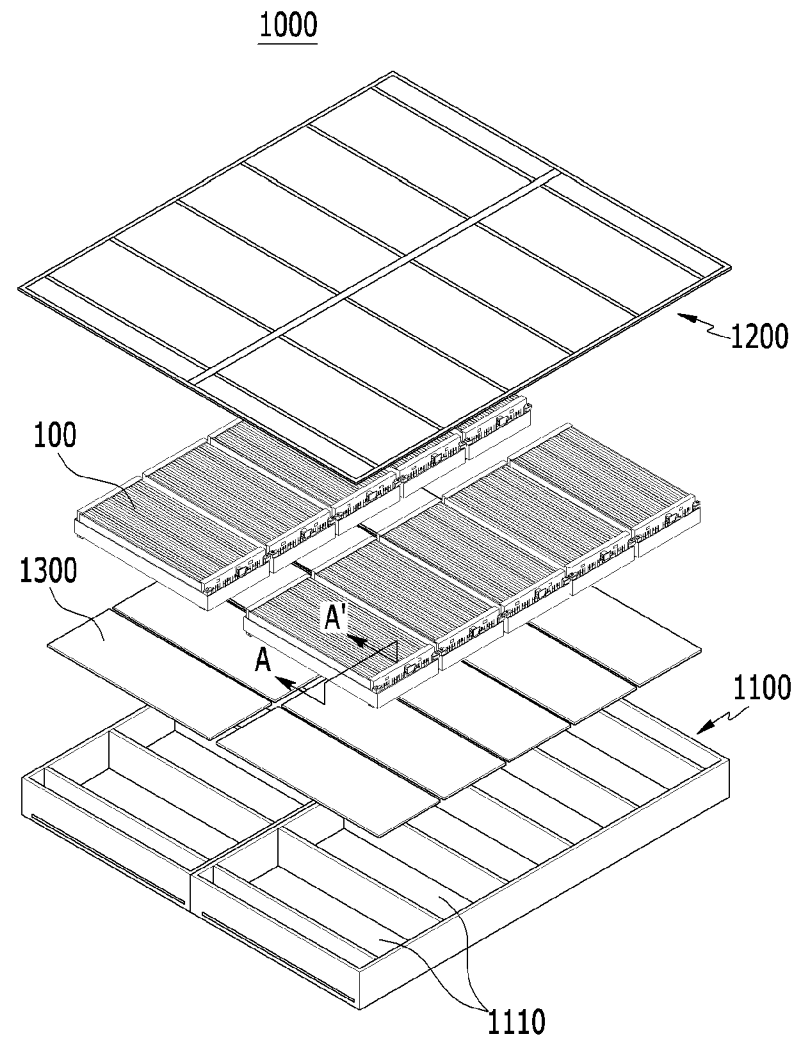
FIG. 7 is an exploded perspective view of a battery pack according to an embodiment of the present disclosure.

FIG. 7 is an exploded perspective view of a battery pack according to an embodiment of the present disclosure. FIG. 8 is a cross-sectional view which shows a cross section taken along the cutting line A-A' of FIG. 7. Wherein, FIG. 8 shows a cross-section thereof assuming that the battery module 100, the thermal conductive resin layer 1300 and the bottom part 1110 of the pack frame 1100 in FIG. 7 are in a state of being in contact with each other, unlike those shown in FIG. 7.

Figure 8:
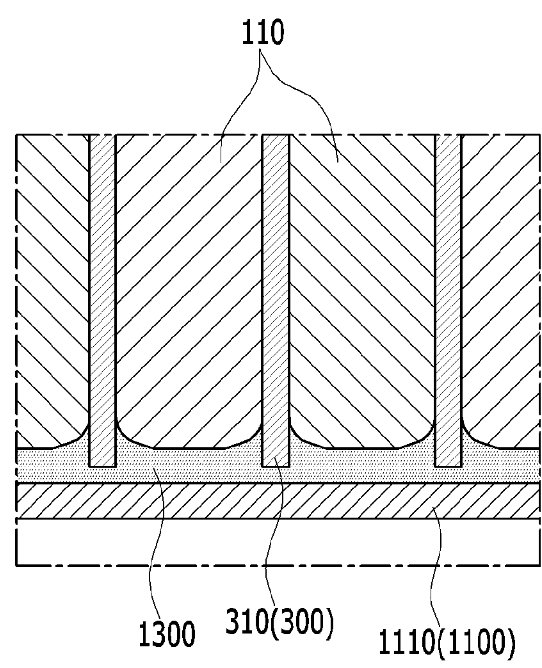
FIG. 8 is a cross-sectional view which shows a cross section taken along the cutting line A-A' of FIG. 7.

Referring to FIGS. 7 and 8, the battery pack 1000 according to an embodiment of the present disclosure may include a battery module 100, a pack frame 1100 for housing the battery module 100 and a thermal conductive resin layer 1300 located between the battery module 100 and the bottom part 1110 of the pack frame 1100.

As described above, the battery module 100 includes a battery cell stack 200 and a cooling fin 300. Since the details of the battery module 100 overlaps with the contents described above, a further description will be omitted.

The battery pack 1000 may further include an upper cover 1200 for covering the pack frame 1100. That is, a plurality of battery modules 100 may be housed between the pack frame 1100 and the upper cover 1200.

The thermal conductive resin layer 1300 can be formed by applying a thermal conductive resin onto the bottom part 1110. Specifically, the thermal conductive resin is applied onto the bottom part 1110, the battery module 100 according to the present embodiment is positioned thereon, and then the thermal conductive resin is cured to form the thermal conductive resin layer 1300.

The thermal conductive resin may include a thermal conductive adhesive material, and specifically, may include at least one of a silicone material, a urethane material, and an acrylic material. The thermal conductive resin is a liquid during application but is cured after application, so that it can perform the role of fixing a plurality of battery cells 110 constituting the battery cell stack 200. Further, since the thermal conductive resin has excellent heat transfer properties, it is possible to quickly transfer the heat generated in the battery module 100 to the bottom part 1110 and thus prevent the battery pack 1000 from overheating.

Referring to FIGS. 2, 7 and 8, the battery module 100 according to the present embodiment may form a module-less structure in which the module frame and the end plate are removed, as described above, and a lower surface of the battery cell stack 200 may be exposed. Therefore, the heat generated in the battery cell 110 may be immediately transferred to the bottom 1110 of the pack frame 1100 through the thermal conductive resin layer 1300. In the case of conventional models having a module frame, since the heat generated from the battery cell passes sequentially through the heat transfer layer inside the module frame and the module frame to be discharged to the outside of the battery module, the heat transfer path is complicated. That is, it is difficult to effectively transfer the heat generated from the battery cell, and a fine air layer, such as an air gap, that may be formed between each of the layers may interfere with heat transfer. On the contrary, since the battery cell 110 according to the present embodiment comes into direct contact with the thermal conductive resin layer 1300 as shown in FIG. 8, the heat transfer path in the lower direction of the battery module 100 may be simplified, and the possibility of generating an air layer such as an air gap can be reduced. Therefore, it is possible to increase the cooling performance of the battery module 100 and the battery pack 1000 including the same.

Further, the cooling fin 300 according to the present embodiment is extended from the lower surface of the battery cell stack 200 to come into contact with the thermal conductive resin layer 1300. Since the lower surface of the battery cell stack 200 is exposed, the cooling fin 300 located between the battery cells 110 can come into direct contact with the thermal conductive resin layer 1300 on the bottom part 1110. Both the first cooling fins 310 and the second cooling fins 320 described above may come into contact with the thermally conductive resin layer 1300. Since the first cooling fin 310 and the second cooling fin 320 disposed in a portion where heat generation is excessive among the battery cell 110 can come into direct contact with the thermal conductive resin layer 1300, it is possible to increase the heat dissipation and cooling performance of the battery module 100.

Meanwhile, in the module-less structure in which the module frame is removed, it is essential to fix the exposed battery cell 110 for structural safety. Therefore, in the battery pack 1000 according to the present embodiment, since each battery cell 110 constituting the battery module 100 is fixed while being in contact with the thermal conductive resin layer 1300, the structural safety can be supplemented.

In addition, the unnecessary cooling structure can be removed, thereby reducing the cost. Further, since the number of parts in the height direction of the battery pack 1000 is reduced, the space utilization rate can be increased, so that the capacity or output of the battery module can be increased.

Although the terms representing directions such as front, rear, left, right, upper and lower directions are used herein, these merely represent for convenience of explanation, and may differ depending on a position of an object, a position of an observer, or the like.

The above-mentioned one or more battery modules according to an embodiment of the present disclosure may be mounted together with various control and protection systems such as BMS (battery management system) and a cooling system to form a battery pack.

The battery module or the battery pack can be applied to various devices. Such a device can be applied to a vehicle means such as an electric bicycle, an electric vehicle, or a hybrid vehicle, but the present disclosure is not limited thereto, and is applicable to various devices that can use a secondary battery.

Although preferred embodiments of the present disclosure have been described in detail above, the scope of the present disclosure is not limited thereto, and various modifications and improvements made by those skilled in the art using the basic concepts of the present disclosure, which are defined in the appended claims, also falls within the scope of the present disclosure.

DESCRIPTION OF REFERENCE NUMERALS

100: battery module
110: battery cell
111, 112: electrode lead
114*a*, 114*b*: end portion
200: battery cell stack
300: cooling fin

The invention claimed is:

1. A battery module comprising:
a battery cell stack in which a plurality of battery cells are stacked; and
a cooling fin located between the battery cells,
wherein each of the battery cells includes a protruding electrode lead,
wherein the cooling fin contacts a region including one end portion of the battery cell in a direction in which the electrode lead protrudes,
wherein the electrode lead comprises a first electrode lead and a second electrode lead that protrude in directions opposite to each other, and that have different polarities from each other,
wherein the cooling fin comprises a first cooling fin and a second cooling fin,
wherein the first cooling fin contacts a region including one end portion of the battery cell in a direction in which the first electrode lead protrudes,
wherein the second cooling fin contacts a region including the other end portion of the battery cell in a direction in which the second electrode lead protrudes, and
wherein the regions that the first cooling fin or the second cooling fin contact are parts of a cell body of the battery cell,
wherein the battery module further comprises an elastic member that covers a front surface, a rear surface and both side surfaces of the battery cell stack,
wherein the battery module further comprises a first sensing block located between the front surface of the battery cell stack and the elastic member, and a second sensing block located between the rear surface of the battery cell stack and the elastic member.

2. The battery module according to claim 1, wherein the first cooling fin and the second cooling fin are disposed so as to be spaced apart from each other, along a direction in which the first electrode lead and the second electrode lead protrude, between the battery cells.

3. The battery module according to claim 1, wherein the battery module further comprises an adhesive member located between the battery cells, and
the adhesive member is located between the first cooling fin and the second cooling fin.

4. The battery module according to claim 1, wherein an upper surface and a lower surface of the battery cell stack are exposed.

5. The battery module according to claim 1, wherein the elastic member is continuously connected along the front surface, the rear surface and the both side surfaces of the battery cell stack.

6. The battery module according to claim 1, wherein the battery module further comprises a side surface pad located between the both side surfaces of the battery cell stack and the elastic member.

7. A battery pack comprising:

the battery module according to claim 1;

a pack frame that houses the battery module; and a thermal conductive resin layer located between the battery module and a bottom part of the pack frame, wherein the cooling fin extends from a lower surface of the battery cell stack and comes into contact with the thermal conductive resin layer.

8. The battery pack of claim 7, wherein the battery cell comes into contact with the thermal conductive resin layer.

9. The battery module according to claim 1, wherein the first sensing block and the second sensing block include a material having electrical insulation, and are configured to cover the front surface and the rear surface of the battery cell stack, respectively.

10. The battery module according to claim 1, further comprising a voltage sensing assembly for transmitting voltage information of the battery cell, wherein the voltage sensing assembly is located in at least one of the first sensing block and the second sensing block.

11. The battery module according to claim 10, wherein the voltage sensing assembly includes a voltage sensing connector, a connection member for connecting the voltage sensing connector and the electrode lead, and a joining plate located at one end of the connecting member and joined to the electrode lead.

* * * * *